(12) United States Patent
Miller

(10) Patent No.: US 11,391,315 B2
(45) Date of Patent: Jul. 19, 2022

(54) PRECISION THREADED LOCATOR FASTENER BUSHING

(71) Applicant: Elijah Tooling, Inc., Denton, TX (US)

(72) Inventor: Richard V. Miller, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 151 days.

(21) Appl. No.: 16/526,322

(22) Filed: Jul. 30, 2019

(65) Prior Publication Data

US 2020/0040933 A1 Feb. 6, 2020

Related U.S. Application Data

(63) Continuation-in-part of application No. 14/063,567, filed on Oct. 25, 2013, now Pat. No. 10,364,836, and a continuation-in-part of application No. 15/883,991, filed on Jan. 30, 2018, now Pat. No. 10,695,877.

(60) Provisional application No. 61/718,585, filed on Oct. 25, 2012, provisional application No. 62/452,164, filed on Jan. 31, 2017.

(51) Int. Cl.
*F16B 37/12* (2006.01)

(52) U.S. Cl.
CPC ................ *F16B 37/125* (2013.01)

(58) Field of Classification Search
CPC ........ F16B 5/0208; F16B 35/00; F16B 35/04; F16B 35/06; F16B 37/042; F16B 37/045; F16B 37/046; F16B 39/04; F16B 39/06
See application file for complete search history.

(56) References Cited

U.S. PATENT DOCUMENTS

| | | | | |
|---|---|---|---|---|
| 1,897,196 A | | 2/1933 | Hunt | |
| 2,092,653 A | * | 9/1937 | Nielsen | B25D 5/00 29/407.1 |
| 2,377,397 A | | 6/1945 | Booth | |
| 3,429,351 A | | 2/1969 | Szalanczy | |
| 3,566,428 A | | 3/1971 | Neuschotz | |
| 3,578,799 A | * | 5/1971 | Davis | B25H 7/00 269/51 |
| 4,043,239 A | | 8/1977 | DeFusco | |
| 4,957,401 A | * | 9/1990 | Hatter | B21H 3/02 411/411 |
| 5,435,678 A | | 7/1995 | Stencel | |
| 5,755,542 A | * | 5/1998 | Janusz | F16B 33/06 411/387.4 |
| 6,022,009 A | * | 2/2000 | Hill | B23Q 1/032 269/289 R |
| 6,095,736 A | * | 8/2000 | Miller | F16B 41/002 411/107 |

(Continued)

OTHER PUBLICATIONS

ASM Int'l, Practical Nitriding and Ferritic Nitrocarburizing (2003) (#06950G) (Year: 2003).*

(Continued)

*Primary Examiner* — Christopher M Koehler
(74) *Attorney, Agent, or Firm* — James E. Walton

(57) ABSTRACT

A precision threaded locator fastener bushing includes a driver portion, an exterior precision locating surface, an interior precision locating surface, and an exterior threaded portion. The precision threaded locator fastener bushing allows various fastening and precision locating devices to be precisely located relative to a fixture plate. The driver portion includes a ten-point driver configuration.

10 Claims, 17 Drawing Sheets

(56) References Cited

U.S. PATENT DOCUMENTS

| | | | | |
|---|---|---|---|---|
| 6,296,431 | B1* | 10/2001 | Miller | F16B 5/0208 |
| | | | | 411/107 |
| 6,361,258 | B1 | 3/2002 | Heesch | |
| 6,439,817 | B1 | 8/2002 | Reed | |
| 8,152,954 | B2* | 4/2012 | Bettencourt | C23C 16/4401 |
| | | | | 156/345.34 |
| 8,770,902 | B1* | 7/2014 | Miller | F16B 5/0208 |
| | | | | 411/107 |
| 9,023,177 | B2* | 5/2015 | Hardin | C23C 16/4401 |
| | | | | 156/345.34 |
| 2002/0090277 | A1* | 7/2002 | LeVey | F16B 37/042 |
| | | | | 411/172 |
| 2003/0165355 | A1 | 9/2003 | Lin et al. | |
| 2004/0016324 | A1* | 1/2004 | Wright | F16B 23/003 |
| | | | | 81/121.1 |
| 2004/0057810 | A1 | 3/2004 | Breslin et al. | |
| 2012/0263555 | A1* | 10/2012 | Wang | F16B 5/0266 |
| | | | | 411/337 |
| 2014/0086705 | A1 | 3/2014 | Dawson et al. | |

OTHER PUBLICATIONS

Office Action dated Jan. 29, 2016 in related U.S. Appl. No. 14/063,567, 6 pages.
Office Action response dated Feb. 2, 2016 in related U.S. Appl. No. 14/063,567, 3 pages.
Office Action dated Apr. 18, 2016 in related U.S. Appl. No. 14/063,567, 9 pages.
Office Action response dated Jun. 28, 2016 in related U.S. Appl. No. 14/063,567, 10 pages.
Office Action dated Jul. 25, 2016 in related U.S. Appl. No. 14/063,567, 11 pages.
Office Action response dated Sep. 26, 2016 in related U.S. Appl. No. 14/063,567, 15 pages.
Examiner Interview Summary dated Nov. 21, 2016 in related U.S. Appl. No. 14/063,567, 3 pages.
Office Action response dated Nov. 23, 2016 in related U.S. Appl. No. 14/063,567, 15 pages.
Office Action dated Dec. 27, 2016 in related U.S. Appl. No. 14/063,567, 14 pages.
Office Action response dated Mar. 27, 2017 in related U.S. Appl. No. 14/063,567, 16 pages.
Office Action dated Jun. 1, 2017 in related U.S. Appl. No. 14/063,567, 13 pages.
Office Action response dated Aug. 1, 2017 in related U.S. Appl. No. 14/063,567, 13 pages.
Office Action dated Jun. 8, 2018 in related U.S. Appl. No. 14/063,567, 11 pages.
Office Action response dated Sep. 7, 2018 in related U.S. Appl. No. 14/063,567, 8 pages.
Office Action dated Dec. 12, 2018 in related U.S. Appl. No. 14/063,567, 9 pages.
Office Action response dated Mar. 12, 2019 in related U.S. Appl. No. 14/063,567, 10 pages.

* cited by examiner

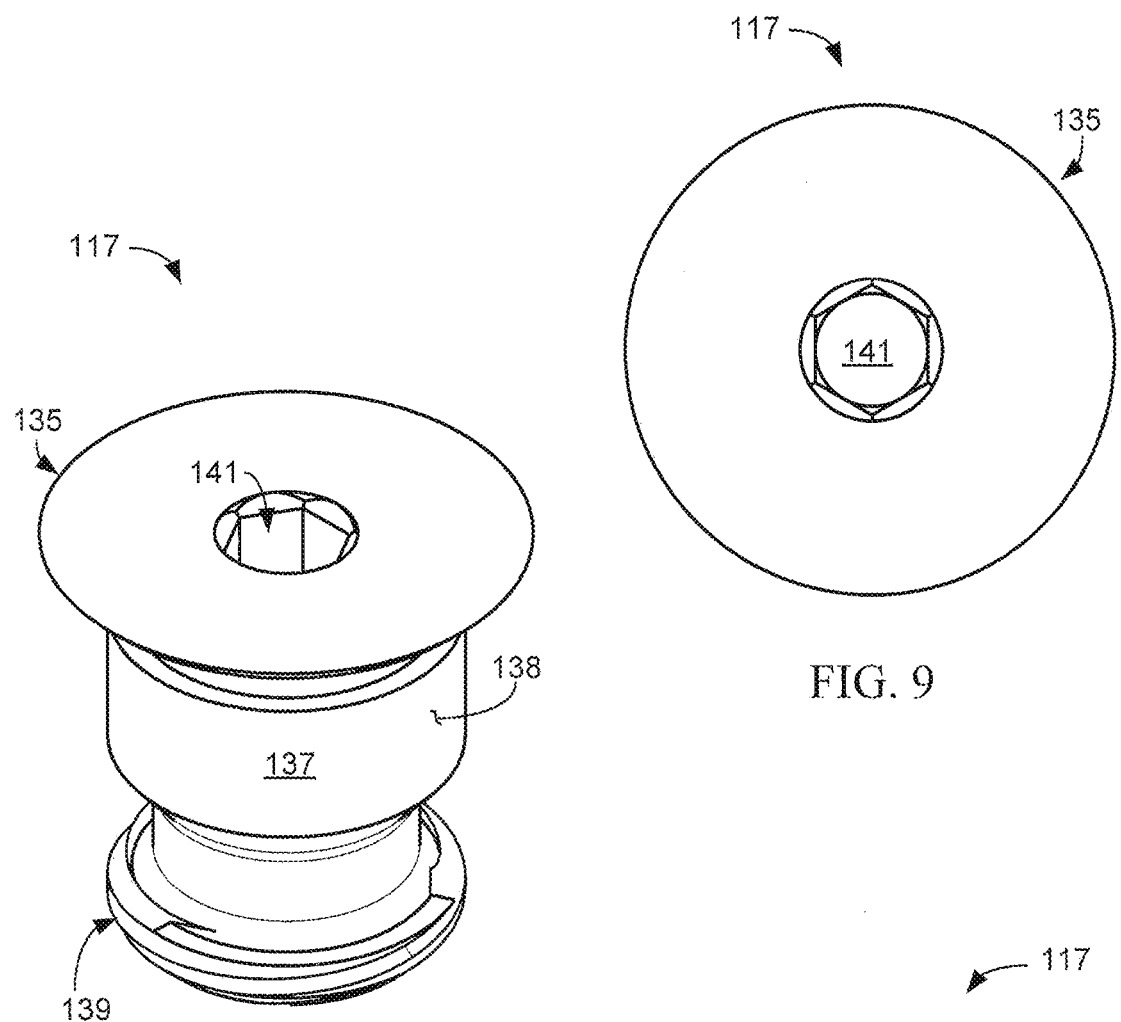
FIG. 8
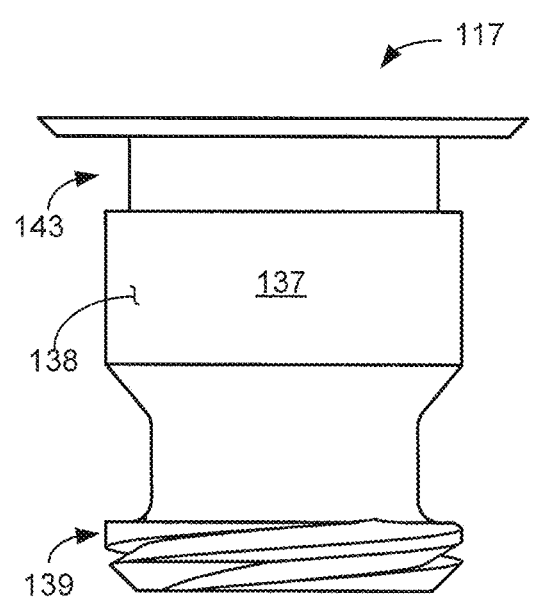
FIG. 9
FIG. 10

PRECISION THREADED LOCATOR FASTENER BUSHING

This application is a Continuation-in-Part of U.S. patent application Ser. No. 14/063,567, filed 25 Oct. 2013, titled "Precision Threaded Locator Bushing," which claims the benefit of U.S. Provisional Application No. 61/718,585, filed 25 Oct. 2012, titled "Bushed and In-Line Threaded Multi-Purpose Hole and Plug;" and this application is a Continuation-in-Part of U.S. patent application Ser. No. 15/883,991, filed 30 Jan. 2018, titled "Workholding System Using Quarter Turn Device," which claims the benefit of U.S. Provisional Application No. 62/452,164, filed 30 Jan. 2017, titled "Workholding System Using Quarter Turn Device;" all of which are incorporated herein as if set forth in full for all purposes.

BACKGROUND

1. Field of the Invention

The present application relates generally to tooling equipment and, more particularly, to a bushed in-line threaded hole and plug.

2. Description of Related Art

Fixture plates are often used to position and secure materials during machining, processing, and working with a wide variety of castings, forgings, and parts. The fixture plates typically provision for multiple tooling components to be installed at selected locations in order to accommodate selected materials and workholding methods. Precise tolerances are often required when producing parts.

A number of working devices are used to support, secure, or locate the material on the fixture plate. In order to accept such devices, fixture plates typically use a threaded member in threaded engagement to the fixture plate and a separate bushing pounded into the fixture plate adjacent to the threaded member. Problems can arise during installation of the bushing wherein damage to the surface of the fixture plate can result as well as the difficulty of pressing the bushing properly. Additionally, removal of the bushing often requires great force and can damage the receiving holes in the fixture plates. Removal is often required when the surface of the fixture plate is to be resurfaced through skimming to remove marring and scarring that has occurred. The orientation of the threaded member and the bushing can also be slightly misaligned when installed or during adjustments. Given the separate nature of the bushing and the threaded member, it is fairly difficult to adjust the position of the bushing and threaded member relative to the fixture plate.

Although great strides have been made in tooling equipment, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 8-10 are views of a plug for use within the locator bushing of FIGS. 1-4.

FIGS. 16A-I are various views of a precision threaded locator fastener bushing according to an embodiment of the present application.

Figure 1:
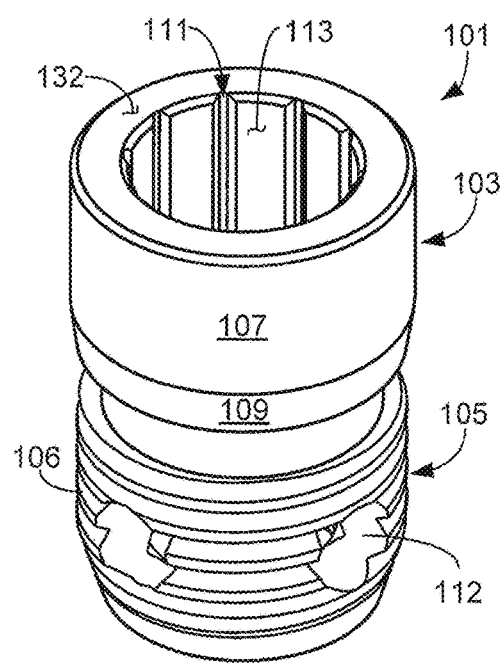
FIGS. 1-4 are views of a locator bushing according to the preferred embodiment of the present application.
Figure 2:
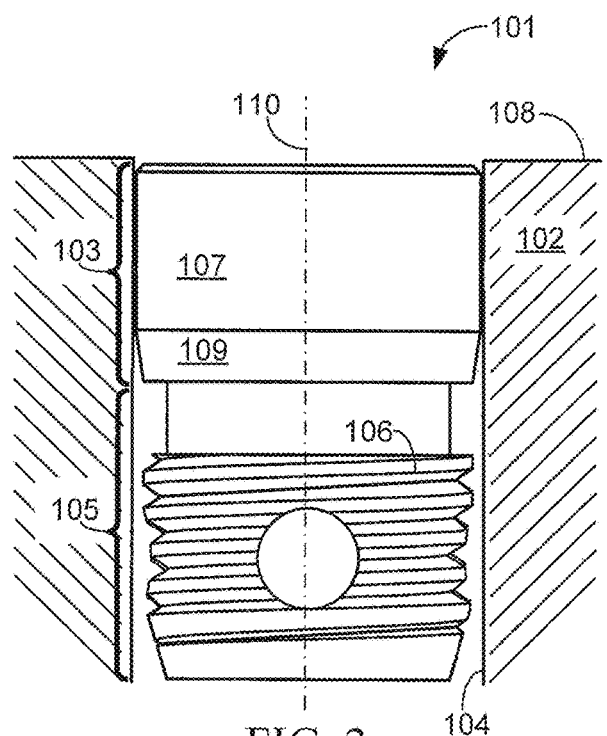

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The terms "precision location" and "precision locating" are used herein. Precision location combines the concepts of accuracy and precision to indicate a situation in which something is reliably located repeatedly. These terms refer to the ability to locate something accurately, in such a way that features that are to be made based upon that location can be depended upon to be in that location over and over again (repeatedly). Accuracy refers to the positional tolerance when compared to theoretical exact positions. The closer the positional tolerance is to theoretical exact positions, the more accurately the piece is located. The more frequently a piece is placed in that position of accuracy indicates its preciseness. The tooling products disclosed herein are used to accurately and precisely change pieces, tools, plates, objects rapidly and repeatedly. This precision location is necessitated by the tolerances required for modern products.

Referring now to FIGS. 1-4 in the drawings, a locator bushing 101 is illustrated. Locator bushing 101 is a combination replacement of individual bushings and threaded inserts used to secure a working device to a fixture plate or receiving member 102. Receiving member 102 includes a bore 104 configured to threadingly receive locator bushing 101. External threads 106 associated with Locator bushing 101 is configured to selectively translate locator bushing 101 within bore 104, such that the relative position of locator bushing 101 with respect to a surface 108 of receiving member 102 is maintained. Locator bushing 101 is secured to receiving member 102 through interference fit with threads 106 and internal threads of bore 104.

Locator bushing 101 is a singular member including a driver portion 103 integrally coupled to a threaded portion 105. Locator bushing 101 includes a central axis 110. Both driver portion 103 and threaded portion 105 are in a co-axial alignment with central axis 110. Locator bushing 101 is also hollow along central axis 110, thereby forming relatively cylindrical internal surfaces. The internal surfaces have varied diameters depending on the location and purpose of the surface with respect driver portion 103 and threaded portion 105.

Driver portion 103 and threaded portion 105 are made from similar materials but are exposed to different processes to achieve varied levels of hardness between them. Driver portion 103 may be hardened through any number of selected processes. For example, driver portion 103 is exposed to a nitride process of case hardening in the preferred embodiment. Such a process provides the benefit of dimensional stability wherein the dimensioning of driver portion 103 is unchanged as a result of the hardening process. It is understood that other processes may be used to harden driver portion 103, such as heat treatment. However, heat treatment may affect the dimensional sizing of locator bushing 101 and include secondary finishing steps. Use of a nitride process does not induce dimensional variation in the part nor require further finishing steps. Driver portion 103 is configured to primarily locate locator bushing 101 and to locate any insert devices received within locator bushing 101, and as such, is increasingly susceptible to dimensional variations and are difficult if not impossible to deal with. Threaded portion 105 is not hardened to the degree of driver portion 103.

Driver portion 103 includes a first locating surface 107 configured to locate locator bushing 101 within bore 104. A locating shoulder 109 is formed on the external surface (surface 107) of driver portion 103, adjacent threaded portion 105. Locating shoulder 109 forms a tapered section wherein the outside diameter of driver portion 103 is decreased approaching threaded portion 105. Shoulder 109 assists in aligning locator bushing 101 within bore 104 while driver portion 103 translates past surface 108 within bore 104. Locating shoulder 109 and locating surface 107 are configured to locate and align central axis 110 with the axis of bore 104. By utilizing first locating surface 107, the location of locator bushing 101 can be precisely maintained within receiving member 102 relative to a given reference location.

Threaded portion 105 is located beneath driver portion 103. Threaded portion 103 includes external threads 106 configured to engage threads within bore 104 to selectively position locator bushing 101 relative to surface 108 of receiving member 102. Locator bushing may be positioned so as to extend above or protrude past surface 108 in one position. In another position, locator bushing 101 may be recessed within bore 104. Threaded portion 105 securely holds locator bushing 101 relative to receiving member 102. Use of threads 106 allows locator bushing 101 to be quickly installed and removed from receiving member 102.

Threaded portion 105 is also optionally configured to be self tapping and include one or more ports or notches to assist in this feature. As seen in the figures, an example of a port or notch is aperture 112. Aperture 112 passes through threaded portion 105. Aperture 112 is optional along with any other ports or notches. In the preferred embodiment, locator bushing 101 is self tapping, but it is understood that some embodiments may not require such a feature.

Driver portion 103 also includes a drive element 111 configured to receive a rotational force to rotate locator bushing 101 bi-directionally, meaning in clockwise rotation and in counter-clockwise rotation. Drive element 111 is formed as indentations or grooves within internal walls of driver portion 102. Drive element 111 is configured to accept a driver of a selected pattern to rotate locator bushing 101. The type of pattern is selected so as to limit the chance of marring when torqued to specification.

Locator bushing 101 is configured to selectively function with any number of insert devices and operate as a system when an insert device is used. An insert device is a tool or member that is configured to engage and interact with locating bushing 101 to precisely and selectively support, secure, and/or locate a material relative to receiving member 102. An example of an insert device is a dowel pin 115 or a plug 117, seen in FIGS. 5-10. It is understood that other types of insert devices are known, such as shoulder screws, retractable dowel pins, rounded and flat supports, and pins to name a few. Insert devices are interchangeable and selectively releasable from one locator bushing 101 to another. Each insert device is sized to properly engage and operate with a respectively sized locator bushing 101. Locator bushing 101 and an included insert device form a locator bushing system.

A second or internal locating surface 113 is formed internally within driver portion 103. Second locating surface 113 is the internal wall of driver portion 103 discussed above in which drive element 111 is formed within. Locating surface 113 is configured to precisely locate the insert device relative to locator bushing 101 and receiving member 102. Locator bushing 101 is uniquely configured to integrate the drive element 111 within locating surfaces 113 to minimize space and increase functionality of the bushing 101.

Threaded portion 105 includes internal threads 119 configured to receive and engage with a threaded portion of the insert device. Threads 119 are used to releasably secure and position the insert device relative to surface 108. Locating surfaces 113 are used to locate the insert device relative to receiving member 102 as stated previously. However, not all insert devices may require a threaded engagement. For example, if the insert device was a support that merely supported an underneath surface of the material while other insert devices or vices are used to secure the material to the receiving member 102, then the need to retain the insert device through threaded engagement with locator bushing 101 is not required. In such a configuration the material itself could be used to apply a force sufficient to prevent the insert device from exiting locator bushing 101. The insert device may be used to merely support but not position or locate the material.

Figure 3:
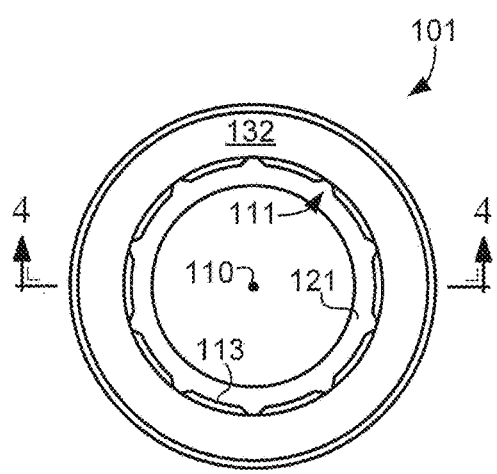
Figure 4:
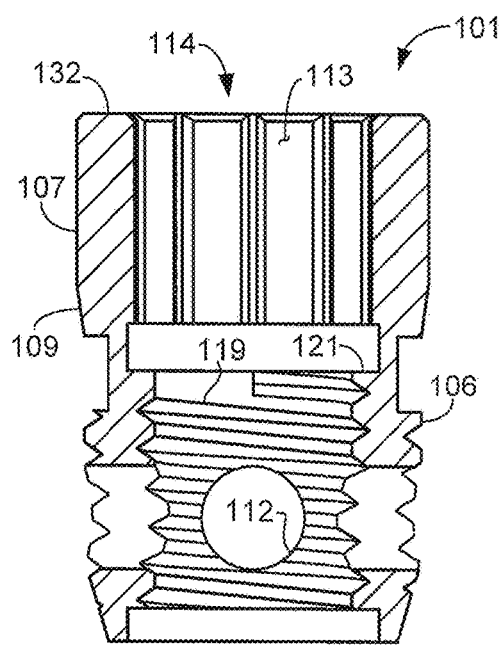

Therefore, as seen in FIGS. 3 and 4 particularly, locator bushing 101 includes an internal shoulder 121. Shoulder 121 serves as the upper portion of threads 119 and serves to form a generally planar surface. Shoulder 121 may be configured to accept contact from an insert device and prevent the passing of the insert device through locator bushing 101. The position (height with respect to surface 108) of the insert may be controlled by translation of locator bushing 101 within bore 104. Additionally, drive element 111 may be used to prevent rotation of the insert device as well as surface 113 to locate the insert device. It is understood that locator bushing 101 can optionally include threads 119.

Figure 5:
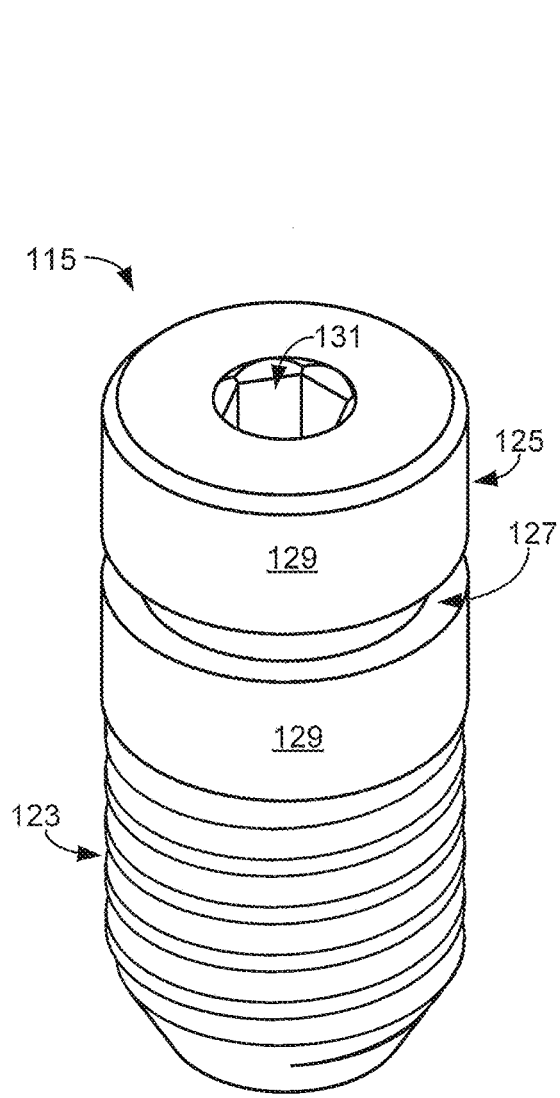
FIGS. 5-7 are views of a threaded dowel pin for use within the locator bushing of FIGS. 1-4.
Figure 6:
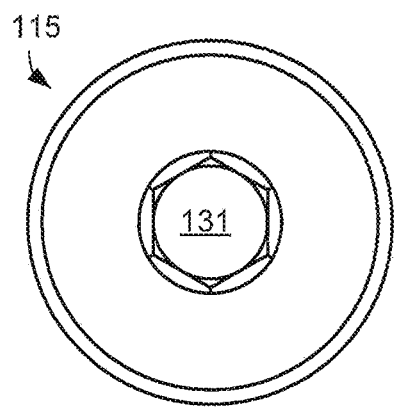
Figure 7:
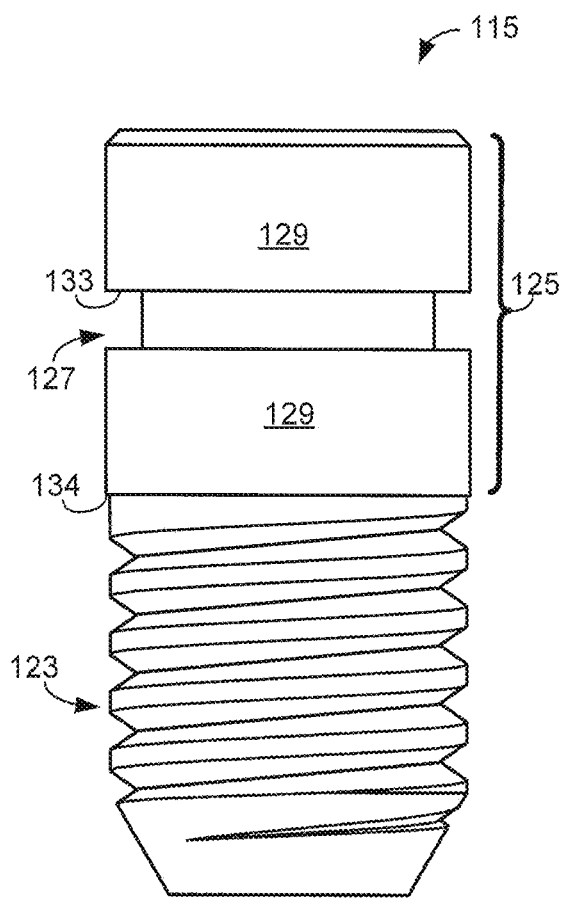
Figure 11C:
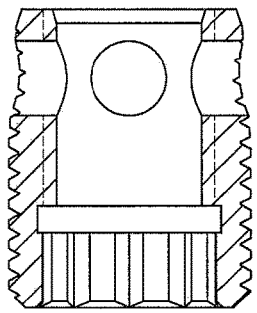
FIGS. 11A-E are various views of a threaded insert according to an embodiment of the present application.
Figure 11:
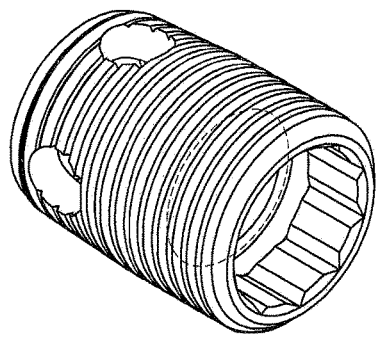
Figure 11A:
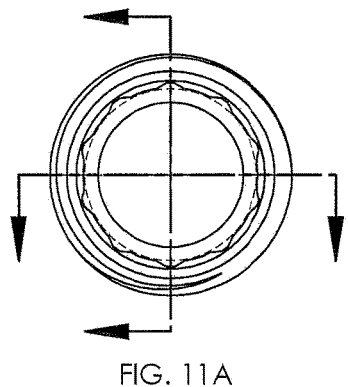
Figure 11B:
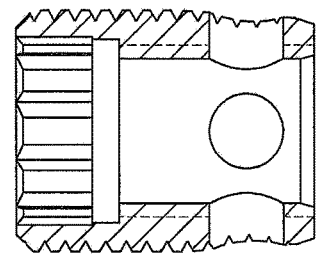
Figure 11:
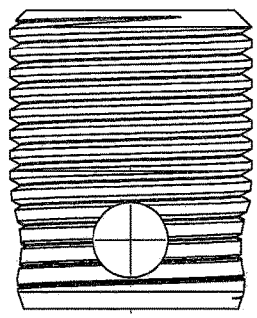
Figure 12B:
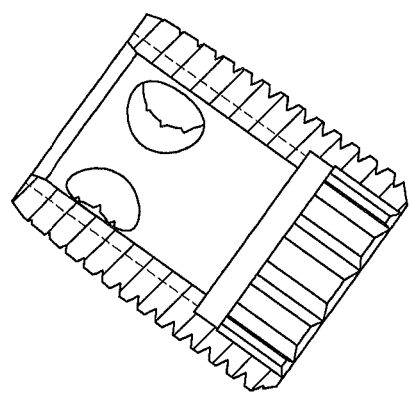
FIGS. 12A-B are various views of a threaded insert according to an embodiment of the present application.
Figure 12A:
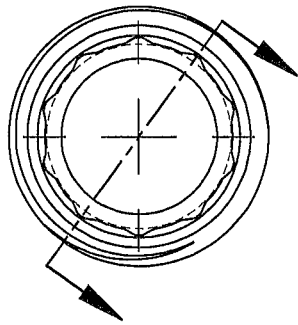
Figure 13D:
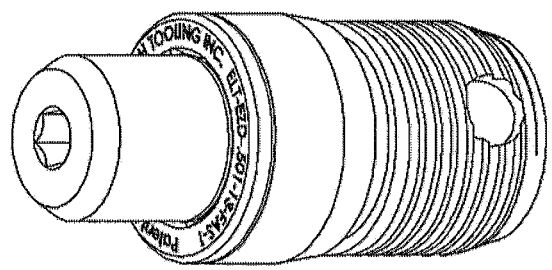
FIGS. 13A-D are various views of a fastener/locator assembly according to an embodiment of the present application.
Figure 13C:
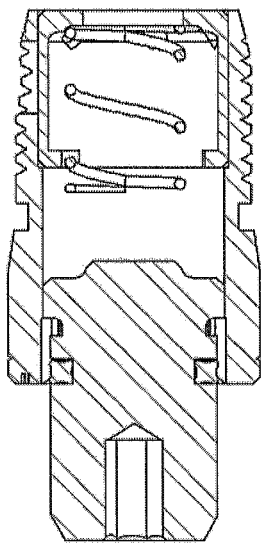
Figure 13A:
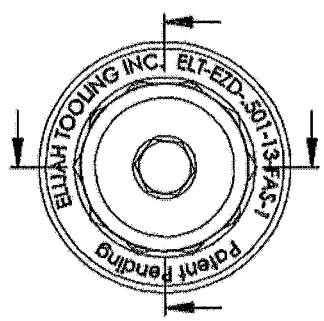
Figure 13B:
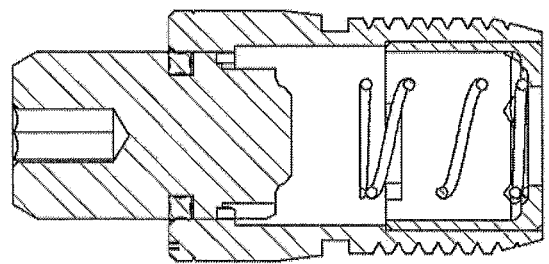
Figure 14:
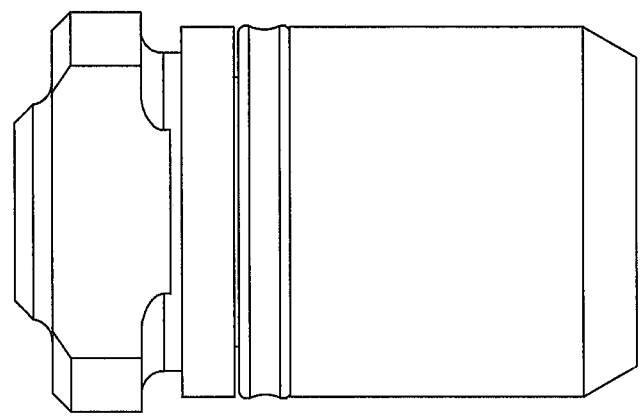
FIG. 14 is a view of a stud assembly according to an embodiment of the present application.
Figure 15D:
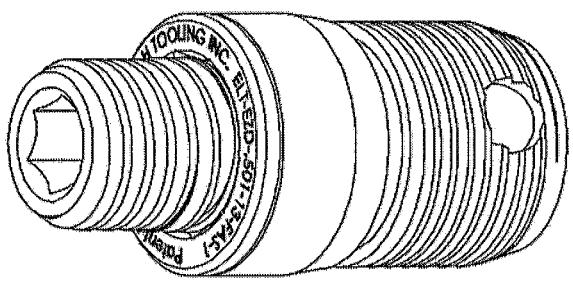
FIGS. 15A-D are various views of a fastener/locator assembly according to an embodiment of the present application.
Figure 15C:
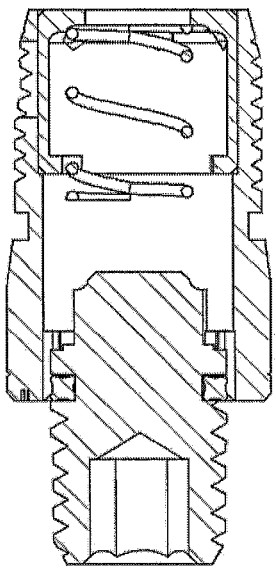
Figure 15A:
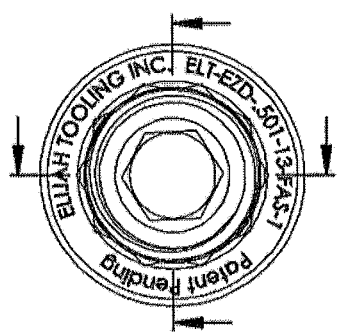
Figure 15B:
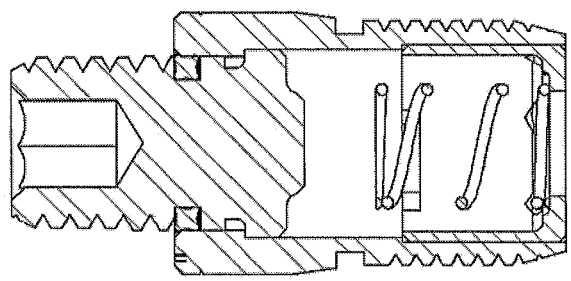
Figure 16F:
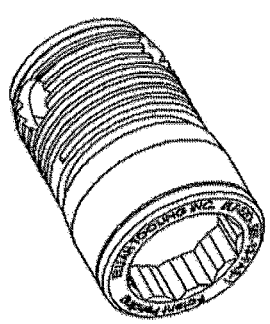
Figure 16E:
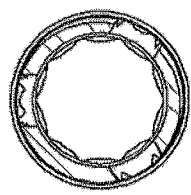
Figure 16G:
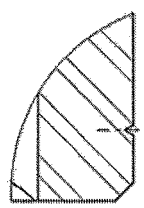
Figure 16D:
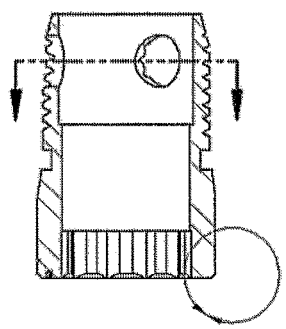
Figure 16A:
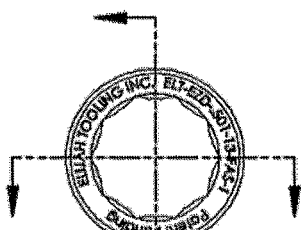
Figure 16B:
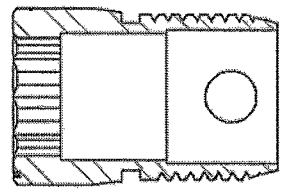
Figure 16C:
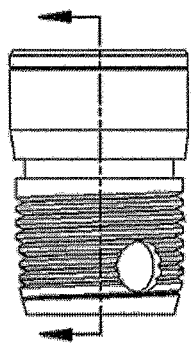
Figure 16I:
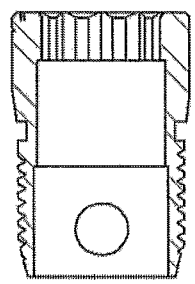
Figure 17:
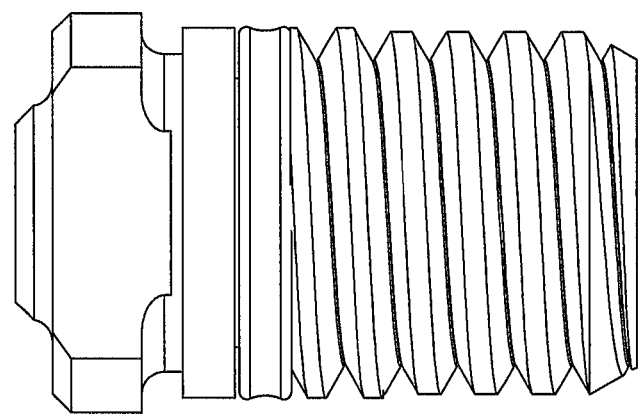
FIG. 17 is a view of a stud assembly according to an embodiment of the present application.
Figure 18C:
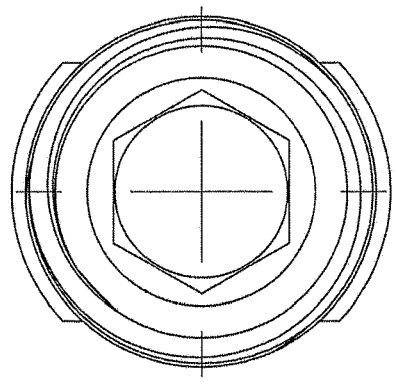
FIGS. 18A-C are various views of a precision stud according to an embodiment of the present application.
Figure 18B:
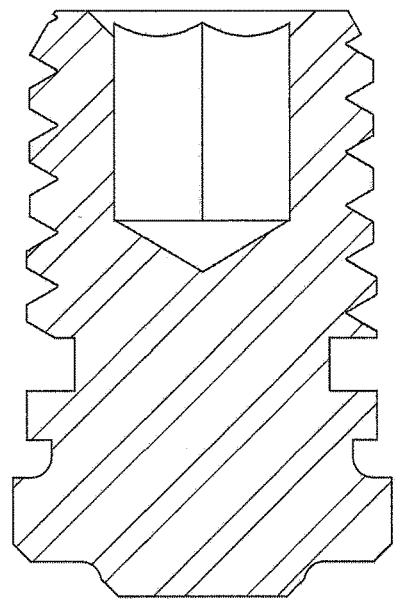
Figure 18A:
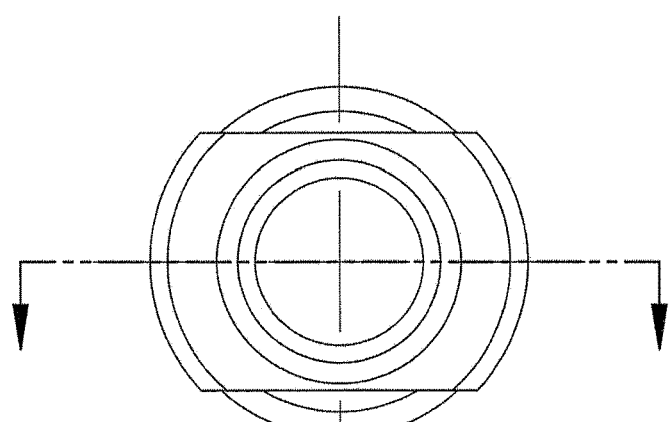
Figure 19B:
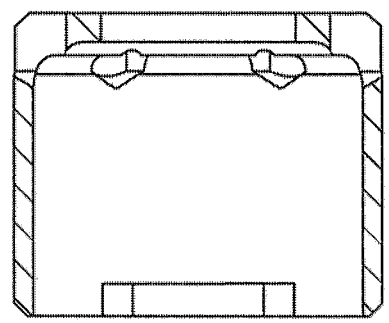
FIGS. 19A-D are various view of a release insert according to an embodiment of the present application.
Figure 19D:
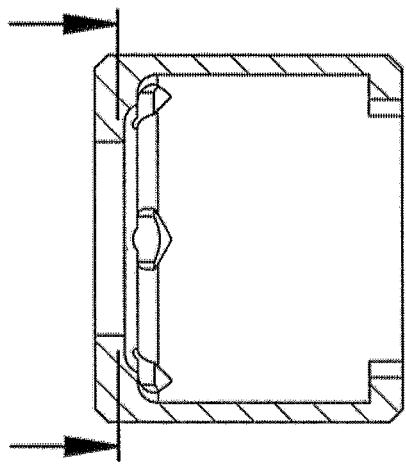
Figure 19A:
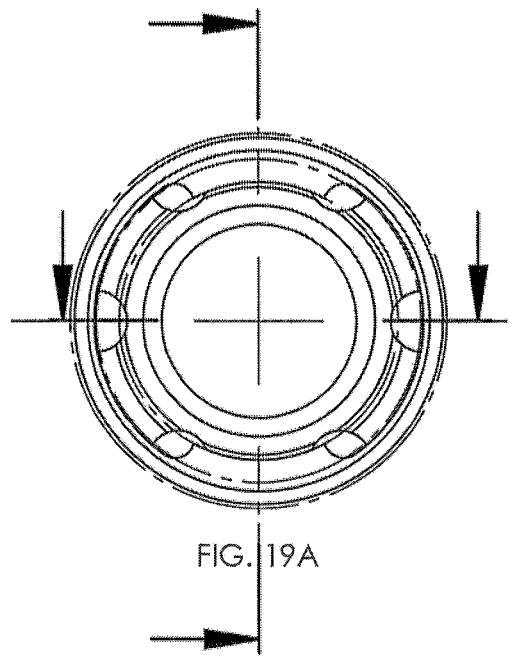
Figure 19C:
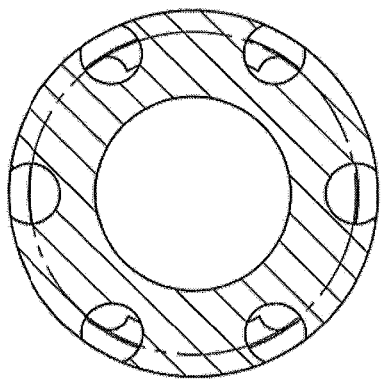
Figure 20C:
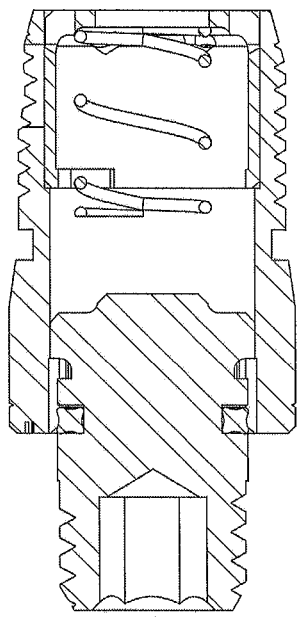
FIGS. 20A-C are various views of a fastener/locator assembly according to an embodiment of the present application.
Figure 20A:
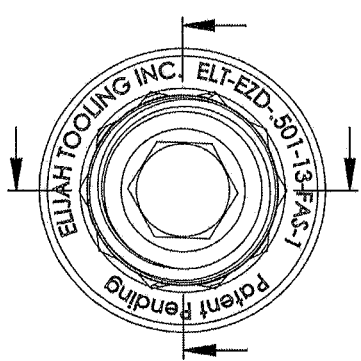
Figure 20B:
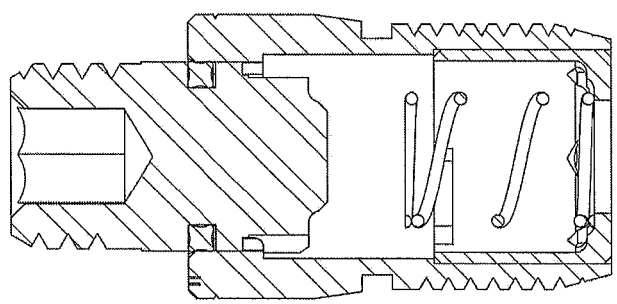
Figure 21:
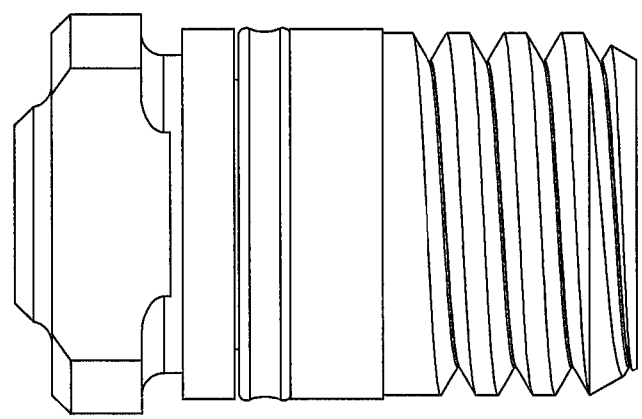
FIG. 21 is a view of a stud assembly according to an embodiment of the present application.
Figure 22C:
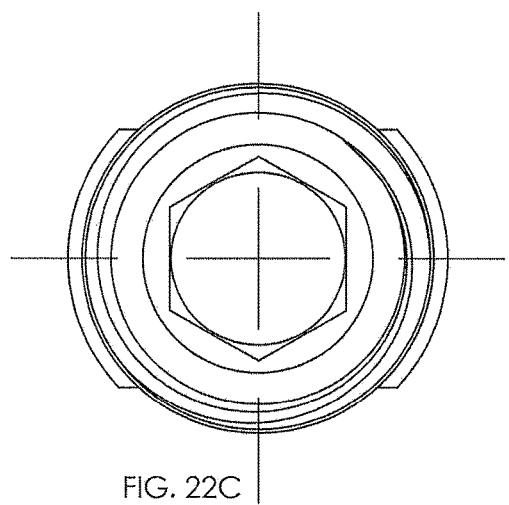
FIGS. 22A-C are various views of a precision stud according to an embodiment of the present application.
Figure 22B:
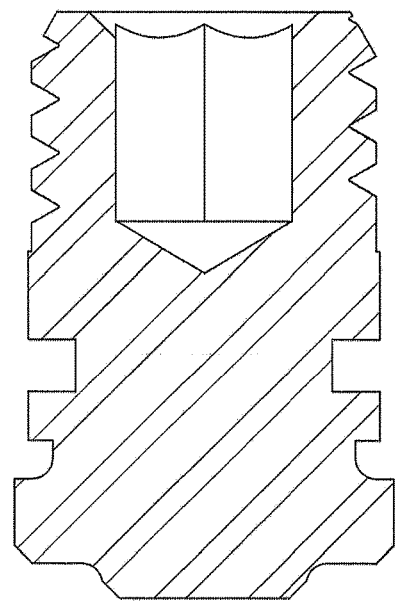
Figure 22A:
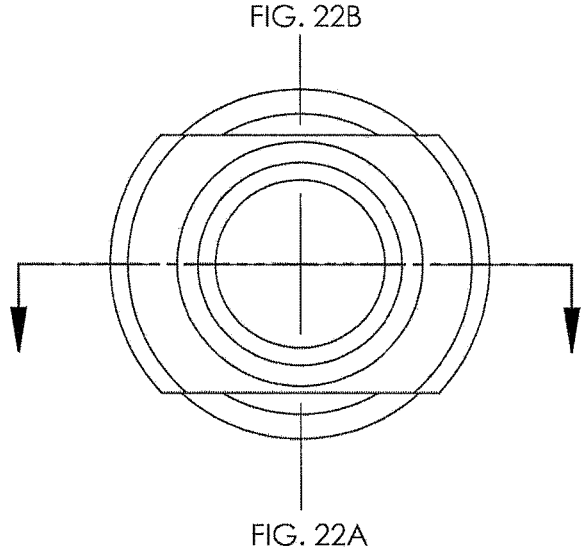
Figure 23F:
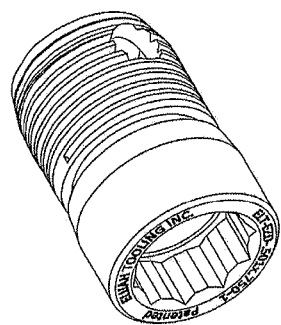
FIG. 23A-F are various views of a precision threaded locator bushing according to an embodiment of the present application.
Figure 23E:
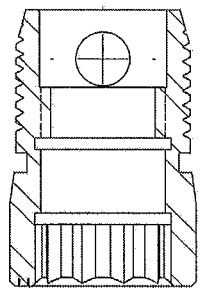
Figure 23A:
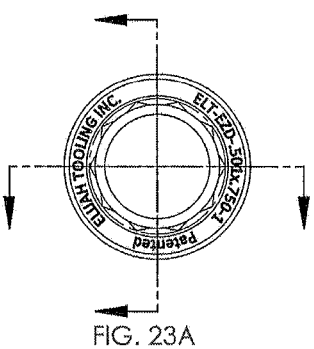
Figure 23B:
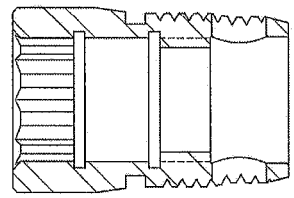
Figure 23C:
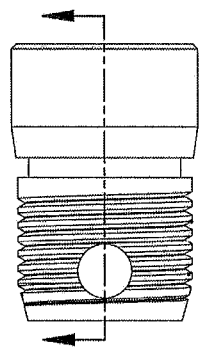
Figure 23D:
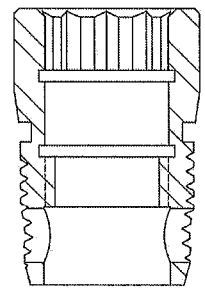
Figure 24D:
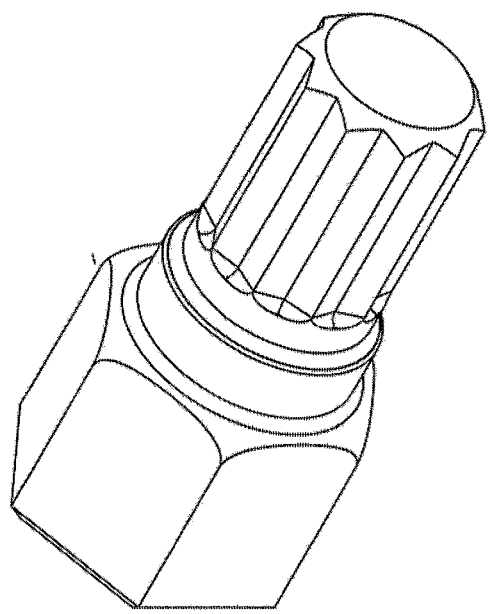
FIGS. 24A-D are various views of a ten-point driver unit according to an embodiment of the present application.
Figure 24C:
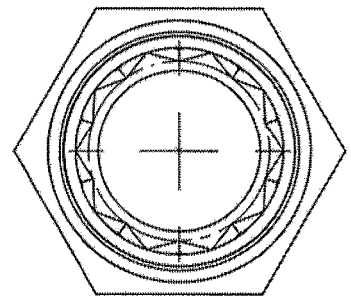
Figure 24B:
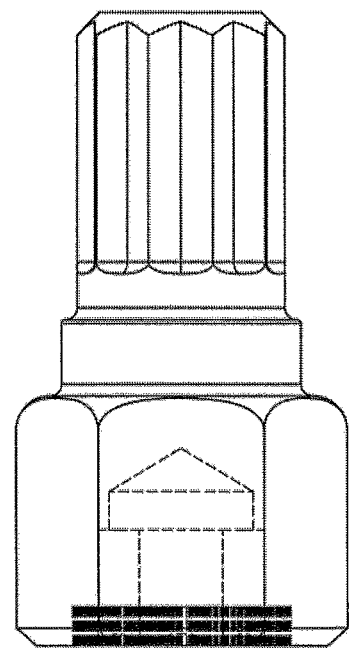
Figure 24A:
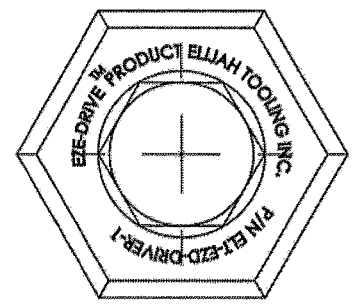

Referring now also to FIGS. 5-7 in the drawings, a dowel pin 115 is illustrated as an example insert device. Pin 115 is a type of round pin. Pin 115 is used to locate material with respect to receiving member 102. Pin 115 includes a threaded portion 123 and a head 125. Pin 115 is designed to be threadingly inserted into locator bushing 101, wherein head 125 can selectively alternate between one or more positions. For example, head 125 may protrude beyond surface 108 in one position and alternatively be recessed within driver portion 103 in another position.

Threaded portion 123 is an elongated cylindrical body having a relatively constant diameter concentrically aligned with head 125. Threaded portion 123 has threads on the exterior used to engage threads 119 of locator bushing 101. Threaded portion 123 may also include a groove 127 for acceptance of a sealing member, such as an o-ring, to prevent debris from entering the threads as head 605 is raised and lowered. Head 125 includes a locating surface 129 configured to contact surface 113 of locator bushing 101 to locate pin 115 relative to receiving member 102. Locating surface 129 may be above and/or below groove 127.

Pin 115 is adapted to accept a fastening tool for inducing a rotational force to rotate pin 115 into locator bushing 101. Pin 115 is shown having a bore 131. Bore 131 is adapted to accept a hex-head tool. However, the scope of pin 115 is not so limited, and, as such, bore 131 may be adapted to accept any other shaped tool, such as a Torx™. In operation, pin 115 may be threadingly raised and lowered in co-axial alignment with central axis 110 of locator bushing 101. When lowered, a lower surface 133, 134 of head 125 may optionally contact shoulder 121.

Referring now also to FIGS. 8-10 in the drawings, plug 117 is illustrated as an example insert device. Plug 117 includes a lid 135, a body 137, and a threaded portion 139. Plug 117 is configured to close and seal an opening 114 of locator bushing 101 to prevent passage of debris and material through the internal surfaces of locator bushing 101.

Threaded portion 139 is an elongated cylindrical body having a relatively constant diameter concentrically aligned with body 137 and lid 135. Threaded portion 139 has exterior threads used to engage threads 119 of locator bushing 101. Plug 117 is designed to be threadingly inserted into locator bushing 101, such that threads 119 engage with threaded portion 139. When plug 117 is in full threaded engagement, lid 135 is configured to contact a portion of driver portion 103, adjacent surface 132.

Plug 117 may also include a groove 143 for acceptance of a sealing member, such as an o-ring, to prevent debris from entering locator bushing 101. It is preferred that groove 143 be adjacent lid 117 but it is understood that other locations are possible and plug 117 should not be so limited to the illustrated position. Plug 117 includes body 137 with a locating surface 138 configured to contact surface 113 of locator bushing 101 to locate pin plug 117 relative to driver portion 103.

Plug 117 is adapted to accept a fastening tool for inducing a rotational force to rotate plug 117 into locator bushing 101. Plug 117 is shown having a bore 141. Bore 141 is adapted to accept a hex-head tool. However, the scope of plug 117 is not so limited, and, as such, bore 141 may be adapted to accept any other shaped tool, such as a Torx™. In operation, plug 117 may be threadingly raised and lowered in co-axial alignment with central axis 110 of locator bushing 101.

It is understood that plug 117 and pin 115 are merely exemplary embodiments of an insert device. Additionally, the outside diameters of body 137 and head 125 may be enlarged to engage shoulder 121 or may be as depicted wherein the diameter of the threaded portions 139 and 123 are the same as head 125 and body 137.

In order to locate, position, and secure an insert device like plug 117 and pin 115, locating bushing 101 is threaded into the receiving member 102 to a selected depth. A driver tool is used to engage drive element 111 to provide the rotational forces to raise and lower locating bushing 101. Once a desired position is reached, the driver tool is removed. An insert device is oriented in axial alignment with central axis 110 and placed within the locator bushing 101. Drive element is used to engage the insert device to rotate it in threaded engagement to a desired position. The insert device is translated (raised or lowered) to a selected position relative to receiving member 102. If threads are not utilized on the insert device, the insert device is oriented in alignment with the driver portion 103. Where applicable, the insert device is located against surfaces 113 of driver portion 103. Removal and/or position adjustment of the insert device is performed by applying rotational forces. It is understood that rotational forces may require a driver tool or may alternatively be "hand-tight" by a user's hand.

Referring now also to FIGS. 11A-24D in the drawings, various alternative embodiments of the precision threaded locator bushing according to the present application are shown and described. The embodiments in these drawings represent various changes and/or modifications to the devices and embodiments described above.

For example, the internal threads may be deeper, which allows the precision locator bushing to be used with a precision locator stud. The precision locator stud is precisely located against the interior locating surface of the precision locator bushing, and the external threads of the precision locator stud are threaded deeper into the internal threads of the precision locator bushing. The features of the precision locator bushing allows other precision locating devices, such as precision locating screws, precision locating dowel pins, precision locating shoulder screws, and precision locating radial locators to be used with the precision locating bushing.

The precision locating bushing fastener of the present application replaces two separate parts: a threaded insert and a bushing. In conventional devices, the bushing has to be pressed into the insert. The precision locating bushing fastener of the present application is a single piece. The precision locating bushing fastener has a ten-point driver receiver element, an interior precision locating surface, and an exterior precision locating surface. The ten-point driver receiving element allows the precision locating bushing fastener to be quickly and easily driven into a fixture plate by the unique ten-point driver unit of FIGS. 24B-D. The interior precision locating surface serves as a precision locating bushing. The ten-point driver can be driven by convention driving tools, such as various sized square socket ratchets, Allen wrenches, etc.

The precision threaded locator fastener bushing is particularly useful with a fixture plate. The precision threaded locator fastener bushing includes a housing having external threads for releasably and adjustably coupling the insert to the fixture plate, an external precision locating surface, an internal precision locating surface, a ten-point driver element formed at one end of the housing by axial grooves projecting into the surface of the internal precision locating surface, and an axial bore passing through the housing; a precision locating stud disposed within the axial bore; a biasing element for biasing the precision locating stud against the ten-point driver element; and an insert installed at the other end of the housing to retain the precision locating stud and the biasing element within the axial bore of the housing.

The precision threaded locator fastener bushing also includes an external precision locating surface formed in one end thereof and a quick-release retaining portion formed in the other end thereof, the quick-release retaining portion being configured to catch an internal lip formed in the insert. The quick-release retaining portion is preferably a quarter turn mechanism.

The precision threaded locator fastener bushing preferably includes an annular groove for receiving a sealing member.

With the precision threaded locator fastener bushing, it is preferred that at least a portion of the housing is case hardened. In the preferred embodiment, a hardness level of the external threads of the housing is different than a hardness level of the external precision locating surface.

The precision locating stud may be a smooth dowel pin, may include external threads, or may be a plug.

With the precision threaded locator fastener bushing, the precision locating stud may include a driving element formed in the end having the external precision locating surface for rotating the precision locating stud relative to the housing.

The unique ten-point driver for installing inserts into fixture plates, preferably includes a base portion and a driver portion having ten radially extending projections, the projections being equally spaced around the perimeter of the driver portion. The ten-point driver preferably includes a socket bore disposed within the base portion, the socket bore being configured to receive a ratchet driver. Also, the base portion of the ten-point driver may have a hexagonal cross section, or any other suitable cross sectional shape.

The current application has many advantages over the prior art including the following: (1) increased speed of operation; (2) threaded insertion of a bearing; (3) avoidance of potentially damaging a surface of a receiving member during installation; (4) fully integrated bushing and threaded portion; (5) simplified removal and interchangeability; and (6) ability to recess the bushing relative to the surface of the receiving member to permit resurfacing of the receiving member.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A precision threaded locator fastener bushing for use with a fixture plate, the precision threaded
    locator fastener bushing comprising:
    a housing comprising:
    external threads for releasably and adjustably coupling the housing to the fixture plate;
    an external precision locating surface;
    an internal precision locating surface;
    a ten-point driver element formed at one end of the housing by axial grooves projecting into the surface of the internal precision locating surface; and
    an axial bore passing through the housing; and
    a precision locating stud disposed within the axial bore, the precision locating stud having an external stud precision locating surface in a first end thereof;
    a biasing element for biasing the precision locating stud in an extended position in which at least a portion of the external stud precision locating surface extends out of the housing; and
    an insert installed at the other end of the housing to retain the precision locating stud and the biasing element within the axial bore of the housing;
    wherein the precision locating stud is radially precisely located against the internal precision locating surface of the housing when the precision locating stud is in the extended position, such that the precision locating stud remains co-axial with the housing between a retracted position and the extended position.

2. The precision threaded locator fastener bushing of claim 1, wherein the precision locating stud comprises:
    a quick-release retaining portion formed in a second end thereof, the quick-release retaining portion being configured to catch an internal lip formed in the insert.

3. The precision threaded locator fastener bushing of claim 2, wherein the quick-release retaining portion is a quarter turn mechanism.

4. The precision threaded locator fastener bushing of claim 1, wherein the precision locating stud comprises:
    an annular groove for receiving a sealing member.

5. The precision threaded locator fastener bushing of claim 1, wherein at least a portion of the housing is case hardened through a nitride process.

6. The precision threaded locator fastener bushing of claim 1, wherein a hardness level of the external threads of the housing is lower than the hardness level of the external precision locating surface.

7. The precision threaded locator fastener bushing of claim 1, wherein the precision locating stud is a dowel pin.

8. The precision threaded locator fastener bushing of claim 1, wherein the precision locating stud includes external threads.

9. The precision threaded locator fastener bushing of claim 1, wherein the precision locating stud is a plug.

10. The precision threaded locator fastener bushing of claim 1, wherein the precision locating stud comprises:
   a driving element formed in the end having the external precision locating surface for rotating the precision locating stud relative to the housing.

\* \* \* \* \*